US008931710B2

(12) United States Patent
Bazergui

(10) Patent No.: US 8,931,710 B2
(45) Date of Patent: Jan. 13, 2015

(54) ROTARY ATOMIZER HAVING ELECTRO-MAGNETIC BEARINGS AND A PERMANENT MAGNET ROTAR

(75) Inventor: Claude Bazergui, Pointe-Claire (CA)

(73) Assignee: Dedert Corporation, Homewood, IL (US)

( * ) Notice: Subject to any disclaimer, the term of this patent is extended or adjusted under 35 U.S.C. 154(b) by 364 days.

(21) Appl. No.: 13/548,712

(22) Filed: Jul. 13, 2012

(65) Prior Publication Data
US 2013/0015264 A1 Jan. 17, 2013

Related U.S. Application Data

(60) Provisional application No. 61/507,864, filed on Jul. 14, 2011.

(51) Int. Cl.

| | |
|---|---|
| *B05B 17/04* | (2006.01) |
| *B01D 1/18* | (2006.01) |
| *F26B 3/12* | (2006.01) |
| *B01J 2/04* | (2006.01) |

(52) U.S. Cl.
CPC ... *B01D 1/18* (2013.01); *F26B 3/12* (2013.01); *B01J 2/04* (2013.01)
USPC .......... 239/7; 239/132; 239/222.11; 239/223; 239/224; 239/263.1; 239/290; 239/403; 239/423; 239/456; 239/513; 384/317; 384/446; 310/90.5

(58) Field of Classification Search
USPC ................ 239/7, 125, 132, 222.11, 223, 224, 239/263.1, 290, 403, 418, 423, 505, 5, 13, 239/456, 458; 384/313, 317, 321, 446, 476; 310/90.5
See application file for complete search history.

(56) References Cited

U.S. PATENT DOCUMENTS 2,070,357 A * 2/1937 Hallinan .................... 239/263.1
2,874,797 A 2/1959 Flury
3,572,589 A 3/1971 Norris (Continued)

FOREIGN PATENT DOCUMENTS

CA 1315538 C 4/1993
CA 1315538 C 4/1993

(Continued)

OTHER PUBLICATIONS

Transmittal; International Search Report; and Written Opinion of the International Searching Authority for International Application No. PCT/US2012/046657 with a mailing date of Dec. 4, 2012.
(Continued)

*Primary Examiner* — Steven J Ganey
(74) *Attorney, Agent, or Firm* — Michael Stanley Tomsa; Katten Muchin Rosenman LLP

(57) ABSTRACT

An improved rotary disc atomizer for use in, for example, spray dryers or congealers is disclosed. The rotary disc may be directly mounted to the shaft of a high-speed electrical motor. The high-speed electrical motor comprises a permanent magnet rotor and electro-magnetic bearings. The electro-magnetic bearings may be supported by one or more upper/lower bearing housings and used to enable frictionless support of the shaft/rotor and rotary disc. The atomizer system may further comprise a gas distributor enabled to dynamically adjust the velocity at which the gas leaves the radial vanes and meets with the atomized droplets.

21 Claims, 2 Drawing Sheets

(56) References Cited

U.S. PATENT DOCUMENTS

Figure 1:
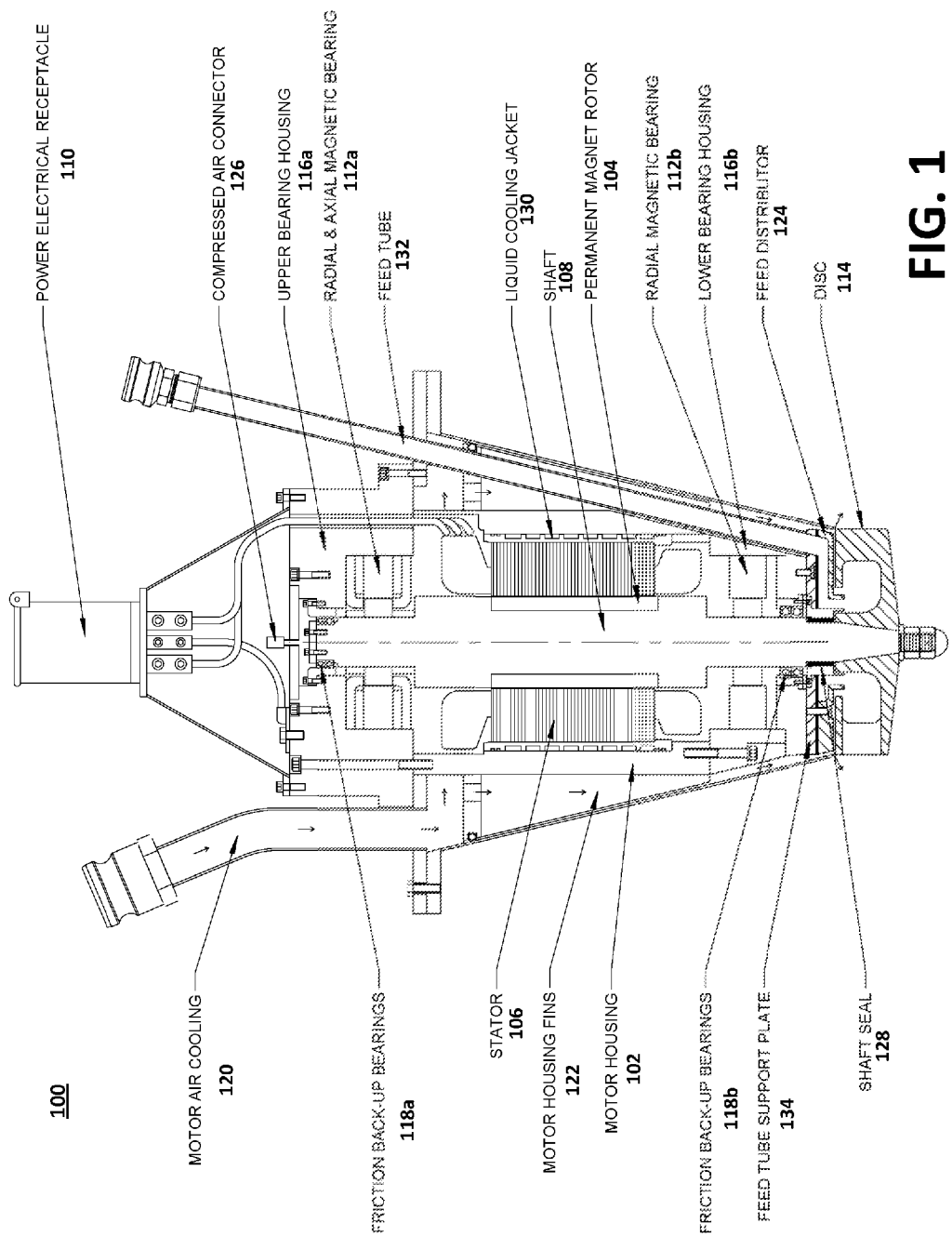

| | | | |
|---|---|---|---|
| 4,201,538 A | 5/1980 | Kopp | |
| 4,530,822 A | 7/1985 | Ashley et al. | |
| 4,899,936 A | 2/1990 | Weinstein | |
| 4,928,883 A | 5/1990 | Weinstein | |
| 4,906,507 A | 6/1990 | Weinstein | |
| 4,936,509 A | 6/1990 | Weinstein | |
| 4,936,510 A | 6/1990 | Weinstein | |
| 4,997,130 A | 3/1991 | Weinstein | |
| 5,083,053 A | 1/1992 | New | |
| 5,518,180 A | 5/1996 | Svendsen | |
| 5,575,830 A | 11/1996 | Yamashita et al. | |
| 5,662,943 A | 9/1997 | Yamashita et al. | |
| 5,697,559 A | 12/1997 | Davis et al. | |
| 5,893,517 A * | 4/1999 | Delamare | 239/223 |
| 6,056,215 A | 5/2000 | Hansinger et al. | |
| 6,551,402 B1 | 4/2003 | Renyer et al. | |
| 7,275,702 B2 | 10/2007 | Nolte et al. | |
| 7,303,937 B2 | 12/2007 | Chen et al. | |
| 7,344,092 B1 | 3/2008 | Kim | |
| 7,445,170 B2 | 11/2008 | Cialone et al. | |
| 7,600,698 B2 * | 10/2009 | Treitz | 239/263.1 |
| 7,611,069 B2 | 11/2009 | Clifford et al. | |
| 7,770,826 B2 | 8/2010 | Ballu et al. | |
| 8,727,232 B2 * | 5/2014 | Kronsteiner | 239/7 |
| 2001/0015386 A1 * | 8/2001 | Pruss | 239/224 |
| 2005/0098102 A1 | 5/2005 | Baumann | |
| 2006/0046330 A1 | 3/2006 | Chen et al. | |
| 2006/0289853 A1 | 12/2006 | Chen et al. | |
| 2007/0034715 A1 | 2/2007 | Clifford et al. | |
| 2007/0281100 A1 | 12/2007 | Herre et al. | |
| 2008/0164342 A1 | 7/2008 | Ballu et al. | |

FOREIGN PATENT DOCUMENTS

| | | |
|---|---|---|
| CA | 1327882 C2 | 3/1994 |
| CA | 1327883 C | 3/1994 |
| CA | 1327884 C | 3/1994 |
| CA | 2169701 A1 | 9/1996 |
| CN | 1071614 A | 5/1993 |
| CN | 2176186 Y | 9/1994 |
| CN | 1028074 C | 4/1995 |
| CN | 2527339 Y | 12/2002 |
| DE | 101 11 005 C1 | 10/2002 |
| DE | 102004032045 A1 | 1/2006 |
| EP | 0 003 803 A1 | 9/1979 |
| EP | 0 132 480 A1 | 2/1985 |
| EP | 2 094 47 A1 | 1/1987 |
| EP | 2 509 42 A2 | 1/1988 |
| EP | 0 705 147 B1 | 3/1994 |
| EP | 0 659 508 B1 | 12/2001 |
| EP | 1 232 800 B1 | 2/2002 |
| EP | 1 348 487 A1 | 10/2003 |
| EP | 1 389 488 A2 | 2/2004 |
| EP | 1 685 163 B1 | 11/2004 |
| GB | 368435 A | 3/1932 |
| GB | 758128 A | 9/1956 |
| GB | 766820 A | 1/1957 |
| GB | 771990 A | 4/1957 |
| GB | 772864 A | 4/1957 |
| GB | 1043762 A | 9/1966 |
| GB | 1249093 A | 10/1971 |
| GB | 1262471 A | 2/1972 |
| GB | 1268331 A | 3/1972 |
| GB | 2 121 203 A | 12/1983 |
| GB | 2 315 742 A | 11/1998 |
| JP | 57-070205 A | 4/1982 |
| JP | 57-201250 A | 12/1982 |
| JP | 60-211358 A | 10/1985 |
| JP | 02-086864 A | 3/1990 |
| JP | 08-266947 A | 10/1996 |
| JP | 09-287001 A | 11/1997 |
| WO | 79/00625 A1 | 9/1979 |
| WO | 93/23172 A1 | 11/1993 |
| WO | 94/14524 A1 | 7/1994 |
| WO | 97/42291 A1 | 11/1997 |

OTHER PUBLICATIONS

"Nano Spray Dryer—Experience Submicron Spray Drying," published Mar. 31, 2011, retrieved Dec. 11, 2012 from LABMATE Online at <http://www.labmate-online.com/news/laboratory-products/3/buchi_labortechik_ag/nano_spray_dryer_-_experience_submicron_spray_drying/14005/>.

Kverneland and Varco, "Permanent magnet motors lead way to better power efficiency, safety on cranes, winches," Lifting & Mechanical Handling, Jul./Aug. 2008.

* cited by examiner

ROTARY ATOMIZER HAVING ELECTRO-MAGNETIC BEARINGS AND A PERMANENT MAGNET ROTAR

CROSS-REFERENCE TO RELATED APPLICATIONS

This application claims the benefit of U.S. Provisional Patent Application No. 61/507,864, entitled "Rotary Atomizer Having Electro-Magnetic Bearings And A Permanent Magnet Rotor", filed Jul. 14, 2011, the entire contents of which are expressly incorporated herein by reference.

TECHNICAL FIELD

The present invention relates generally to rotary disc atomizers for use in spray dryers or congealers, and more specifically to rotary atomizers having electro-magnetic bearings and/or a permanent magnet rotor. The present invention also relates to systems, methods, and apparatuses for adjusting gas stream velocity during atomizer use and, more specifically, to systems, methods, and apparatuses for dynamically adjusting gas stream velocity.

BACKGROUND

Spray drying is a method of producing dry powder/particles from a slurry or solution liquid by rapidly drying the liquid with a hot gas stream. Spray drying is the preferred method of drying many thermally sensitive materials such as foods and pharmaceuticals. A consistent particle size distribution is a reason for spray drying some industrial products, such as catalysts and other chemicals. Typically, air is the heated drying medium; however, nitrogen may be used if the liquid being atomized is a flammable solvent (e.g., ethanol) or if the product is oxygen-sensitive.

Generally speaking, spray dryers use an atomizer or spray nozzle to disperse a liquid into a controlled-drop-size spray. Common types of nozzle used in spray drying include rotary disc and single-fluid pressure swirl nozzles. Alternatively, for some applications, two-fluid or ultrasonic nozzles may be used. Depending on the process and/or product needs, drop sizes from 10 to 500 micrometers may be achieved with the appropriate choices. However, common applications are often in the 100 to 200 micrometer diameter range.

A hot, drying gas stream (e.g., air, nitrogen, etc.) may be passed as a co-current or counter-current flow to the atomizer direction. The co-current flow method enables the particles to have a lower residence time within the system, and the particle separator (typically a cyclone device) operates more efficiently. The counter-current flow method enables the particles to have a greater residence time in the chamber and usually is paired with a fluidized bed system.

A nano spray dryer offers new possibilities in the field of spray drying. It allows production of particles in the range of 300 nm to 5 µm with a narrow size distribution. High yields are produced—up to 90%—and the minimum sample amount is 1 ml. In the past, the limitations of spray drying were the particle size (minimum 2 micrometers), the yield (maximum around 70%), and the sample volume (minimum 50 ml for devices in lab scale). Recently, minimum particle sizes have been reduced to 300 nm, yields up to 90% are possible, and the sample amount can be as small as 1 ml. These expanded limits are possible due to new technological developments to the spray head, the heating system, and the electrostatic particle collector. To emphasize the small particle sizes possible with this new technology, it has been described as "nano" spray drying. However, the smallest particles produced are typically in the sub-micrometer range common to fine particles rather than the nanometer scale of ultrafine particles. For further information on nano spray drying, see, for example, the Mar. 31, 2011 article entitled "Nano Spray Dryer—Experience Submicron Spray Drying," available at http://www.labmate-online.com/news/laboratory-products/3/buchi_labortechik_ag/nano_spray_dryer_-_experience_submicron_spray_drying/14005/.

Numerous attempts have been made over the years to improve rotary atomizer performance. For example, U.S. Pat. No. 7,611,069 to Clifford, et al., entitled "Apparatus and Method for a Rotary Atomizer with Improved Pattern Control," discloses an apparatus and method for forming and controlling a pattern for spraying surfaces with a fluid using a rotary atomizer spray head having an air shaping ring with shaping air nozzles inclined in a direction of rotation of a bell cup to direct the air onto the cup surface near the cup edge. U.S. Pat. No. 7,344,092 to Kim, entitled "Rotary Atomizer, And Air Bearing Protection System For Rotary Atomizer," discloses a rotary atomizer and an air-bearing protection system for the rotary atomizer to reduce the manufacturing cost. Kim recognizes that high-speed rotation generates a lot of heat and load upon the atomizer during continuous operation. In order to remove this heat, lubricating equipment is commonly used, which leads to complexity in the system structure and consequently to difficulties in maintenance and an increase in the manufacturing cost.

U.S. Pat. No. 6,551,402 to Renyer, et al., entitled "Rotary Atomizer," discloses a system utilizing a rotary atomizer for applying a liquid-based substance to particles. Renyer recognizes that rotary atomizers typically require a high-speed rotational force within the vicinity of moving particles (as with a continuous flow process) and that machinery that utilizes rotary atomizers can be somewhat complicated, requiring several moving parts which can be subject to frequent breakdowns.

Despite the various advancements in and array of existing atomizers and atomizing systems, current technology still requires regular maintenance and repair, leading to unnecessary repair cost and downtime. Thus, a need exists for an improved rotary atomizer and atomizing system that requires minimal maintenance while yielding increased revolutions per minute ("RPM") and providing the ability to direct and adjust gas stream velocity.

SUMMARY OF THE INVENTION

The present application discloses a system and method for improving rotary atomizer reliability while producing increased RPM to yield an increased disc speed. The present application also discloses a system and method for providing the ability to dynamically direct and adjust gas stream velocity.

According to a first aspect of the present invention, a rotary atomizer comprises an electric motor having a stator and a permanent magnet rotor enabled to output a rotating force; a shaft vertically installed and having a desired length, the shaft capable of being rotated by the rotating force; one or more magnetic bearings for enabling frictionless radial and axial support of the shaft; and a rotating disc installed at a lower end of the shaft for spraying liquid in the form of fine particles.

In some aspects of the present invention, the rotary atomizer may further comprise cooling fins for directing cooling air from a blower across the stator to pick up heat dissipated by the stator. The cooling air may be expelled from the rotary atomizer through an annulus gap between the rotating disc and a feed distributor. Furthermore, the rotary atomizer's electric motor may be enabled to rotate the shaft at a speed allowing for disc peripheral tip speeds in excess of 900 feet per second ("ft/s"). For example, a 12-inch diameter disc could be rotated at about 18,000 RPM to yield a speed of about 940 ft/s. The rotary atomizer may further comprise a compressed air connector for receiving compressed air to be diverted into gaps between the shaft and the one or more magnetic bearings and/or to a liquid cooling jacket for removing excess electrical heat from the stator. A rotary atomizer may further comprise friction back-up bearings enabled to impede the shaft's rotation in the event of loss of magnetic levitation.

According to a second aspect of the present invention, an atomizer system comprises an adjustable outer cone; a fixed inner cone configured to receive an atomizer; a chamber; and one or more adjustable vertical members coupled to one or more height actuators for dynamically adjusting the adjustable outer cone. In some aspects, the atomizer system may further comprise one or more radial swirl vanes.

According to a third aspect of the present invention, a method for atomizing slurry material comprises feeding slurry material to a rotary atomizer, wherein the rotary atomizer comprises an electric motor enabled to rotate a shaft at a certain speed (this depends on the size of the disc; a small 8-inch diameter disc will need to rotate at 26,000 RPM); using the rotary atomizer to output the liquid material in the form of atomized droplets; and circulating the atomized droplets with process gas to produce substantially dry particles. In some aspects, the method may further comprise the step of dynamically adjusting gas stream velocity using at least one vertical member coupled to an actuator.

In certain aspects of the present invention, the adjustable outer cone may be dynamically adjusted to yield a first gas stream having a first velocity and a second gas steam having a second velocity that is greater than the first velocity. The one or more height actuators may comprise an actuator(s) chosen from a group consisting of (i) electric actuators; (ii) hydraulic actuators; (iii) pneumatic actuators; (iv) manual actuators; and (v) combinations thereof. The atomizer may be a rotary atomizer comprising a permanent magnet rotor and/or one or more electro-magnetic bearings enabled to provide frictionless radial and axial support of the shaft.

DESCRIPTION OF THE DRAWINGS

These and other advantages of the present invention will be readily understood with reference to the following specifications and attached drawings wherein:

FIG. 1 is a cutaway side view of a rotary atomizer according to the present invention; and FIG. 2 is a cutaway side view of an exemplary apparatus utilizing a rotary atomizer according to the present invention.

DETAILED DESCRIPTION

Preferred embodiments of the present invention will be described hereinbelow with reference to the accompanying drawings. In the following description, well-known functions or constructions are not described in detail because they may obscure the invention in unnecessary detail. The present application discloses systems, methods, and apparatuses for improving rotary atomizer reliability while yielding higher RPM to yield an increased disc speed. The present application also discloses a system and method for providing the ability to dynamically direct and adjust gas stream velocity.

FIG. 1 illustrates an exemplary rotary atomizer system 100 having improved reliability and enabled to yield increased RPM and disc speed. Rather than employing an induction rotor such as those used in existing rotary atomizer systems, the rotary atomizer system 100 uses an electric motor having a permanent magnet rotor 104, resulting in a more efficient motor requiring less physical space for a given power output. The electric motor, which receives power via the power electrical receptacle 110, generally comprises a motor housing 102, permanent magnet rotor 104, a stator 106, and a shaft 108. A smaller motor size typically allows for closer proximity of the disc to the lower motor bearing. For example, the motor of the present invention is preferably between about 10 inches by 10 inches through about 72 inches by 72 inches. More preferably, the motor can be approximately 25 inches by 25 inches through about 45 inches by 45 inches. Most preferably, the motor can be about 30 inches by 36 inches. In a preferred embodiment, the motor is about 30 inches by 36 inches, has a power of approximately 330 horsepower, and has internal discs capable of spinning around 16,000 RPM. The motor is preferably constructed with aluminum which is both resistant to corrosion and a good dissipater of heat. Other materials such as stainless steel, or other metals or plastics are envisioned. As a result of the ability to have closer proximity, a motor can operate throughout its speed range while remaining below the first critical speed of the shaft. Rotating shafts, even in the absence of an external load, can deflect during rotation. The combined weight of a shaft and disc can cause deflection that often creates resonant vibration above a certain speed, known as the critical speed. Thus, to function properly, the motor should be operated at speeds less than the critical speed. Also, this motor configuration permits use of a smaller disc diameter, which is generally less costly and easier to manipulate, leaving sufficient room around the motor for the placement of the liquid feed tube(s).

A permanent magnet rotor provides numerous advantages over its AC equivalents (e.g., induction or asynchronous motors). For instance, permanent magnet rotors generally yield a higher speed and higher torque output, while increasing power efficiency by eliminating the need for unnecessary current that would otherwise flow through the rotor windings of traditional induction motors. Another benefit attributed to the use of permanent magnet rotors is increased power density (i.e., the power that may be extracted from a given space). Generally speaking, a permanent magnet motor typically produces as much as 30% to 40% more power density than a conventional and similar-sized AC asynchronous motor. An increase in power density provides the opportunity to increase performance without requiring additional space for a larger motor or, alternatively, to reduce the motor size and weight while maintaining the original performance. Decreasing motor power size and consumption can lead to lower operating temperatures, thus reducing the efforts needed to cool the motor and/or motor system.

The electric motor system may further employ one or more electro-magnetic bearings **112*a*, 112*b*, which may be supported by one or more upper/lower bearing housings 116*a*, 116*b* to enable frictionless support of the shaft 108, rotor 104, and disc 114. However, in certain embodiments, bearing housings may not be necessary. For example, a single housing may encompass both bearings and a stator. A benefit of the magnetic bearings 112*a*, 112*b* is that they are contactless and thus do not require lubrication or speed restrictions on the electric motor. The magnetic bearings 112*a*, 112*b* may also provide both primary radial and axial support for the shaft 108, rotor 104, and disc 114**. Therefore, the atomizer system of the present invention is able to safely operate at higher RPM to yield increased disc speeds.

The atomizer 100 may further comprise a set of friction back-up bearings 118a, 118b with a gap between the bearings' 118a, 118b inner surfaces and the shaft 108 during normal operation. In the event of loss of magnetic bearing 112a, 112b operation, the shaft 108 would contact the inner bearing 118a, 118b surfaces to bring the rotor 104 to a safe stop.

Using a permanent magnet rotor 104 in conjunction with frictionless magnetic bearings 112a, 112b permits the atomizer to reach greater and more favorable operating RPM speeds, thereby increasing spray drying efficiency while also reducing maintenance. A favorable operating speed (RPM) will vary depending on the size of the disc. Accordingly, discs are available in a plurality of sizes; however, smaller disc sizes may be preferable because they are generally less expensive and easier to manipulate. Therefore, the atomizer disclosed herein will be described as having a disc diameter of approximately 12.75 inches. However, it would be obvious to one having skill in the art to install a disc with a different diameter. For example, a smaller power atomizer may have an 8-inch diameter disc, and a larger unit could have a 16-inch diameter or larger disc.

As mentioned, the RPM necessary to reach a target peripheral disc tip speed will vary depending on the size of the disc being used. For example, to maintain a peripheral disc tip speed of 900 ft/s, a smaller 8-inch diameter disc will need to be rotated at 26,000 RPM while a larger 12-inch diameter disc will need to be rotated at 18,000 RPM. Due to limitations on the motors and frictional losses, current atomizers typically yield a disc peripheral tip speed only up to 800 ft/s; however, the atomizer of the present invention is advantageous in that it is capable of producing more preferable speeds without needing to employ a larger disc size (e.g., speeds greater than 800 ft/s; more preferably, greater than 900 ft/s; even more preferably, 900-1,125 ft/s). For instance, a peripheral disc tip speed of 1,000 ft/s may be readily ascertained using the system of the present invention by rotating a 12.75-inch disc at a speed of about 18,000 RPM. Similarly, a peripheral disc tip speed of 1,100 ft/s may reached by rotating a 12.75-inch disc at a speed of about 19,800 RPM or, alternatively, by rotating a 16-inch diameter disc at about 15,750 RPM. These higher rotational speeds permit higher throughput for a given-diameter disc and achieve smaller particle sizes that do not hit and/or become deposited on the chamber walls. By adjusting disc size and RPM, a designer may achieve virtually any desired peripheral disc tip speed using the following equation, where TipSpeed is the peripheral disc tip speed in ft/s, D is the diameter of the disc in inches, and s is the RPM of the disc.

$$TipSpeed = D(\pi)(s)\frac{1}{12} \cdot \frac{1}{60} \qquad \text{Equation 1}$$

Electrical heat losses from the motor stator 106 may be removed and/or regulated using cooling air 120. To promote temperature regulation, the stator housing 102 may have cooling fins 122 distributed evenly along its periphery. While the fins 122 are preferably evenly distributed, they may be adjusted to divert air to, or away from, particular areas if one area requires additional cooling. Above the fins 122 is a distributor with holes that line up with each fin cavity. Cooling air from a blower enters the distributor and exits through the holes, and then proceeds to pick up the heat dissipated into the stator housing fins 122. The same cooling air 102, now heated, may be directed and expelled to the outside of the atomizer cone housing through an annulus gap between the feed distributor 124 and the rotating disc 114. The feed, which may be a slurry (e.g., particles and fluid), may be fed to the disc 114 by way of the feed tube 132. The feed tube 132 may be supported by the feed tube support plate 134.

The rotating disc 114 can function as a pump impeller, thus creating a suction pressure at its central annulus opening. This phenomenon has the tendency to entrain process gas along with partially dried atomized feed droplets from the surroundings. This negative effect causes feed product to deposit and build up on the disc top surface, resulting in disc imbalance and possible blockage between the disc top surface and the feed distributor bottom surface, and preventing the disc from rotating properly.

Therefore, the cooling air 120 may serve a second function of acting as a clean gas barrier between the suction pressure of the disc 114 and the atomized droplets, thus preventing the ingress of particles while supplying the rotating disc 114 with clean air.

An alternative, or supplemental, motor cooling method may be to have a coolant passage jacket 130 surrounding the stator 106, whereby coolant may be supplied either as a once-through or as a recirculated loop with a heat exchanger to remove the excess electrical heat from the stator.

Further cooling of the motor may be accomplished by supplying cooled compressed air (or air from a high-pressure blower) into the gaps between the shaft 108 and magnetic bearings 112a, 112b, and the rotor 104 and stator 106. This air may be introduced at the top of the motor assembly via an air connector 126 and may be expelled at the bottom through a labyrinth shaft seal 128 and into the disc 114. This now pressurized non-contact shaft seal 128 prevents the ingress of liquid feed from the disc 114 into the motor cavity.

Figure 2:
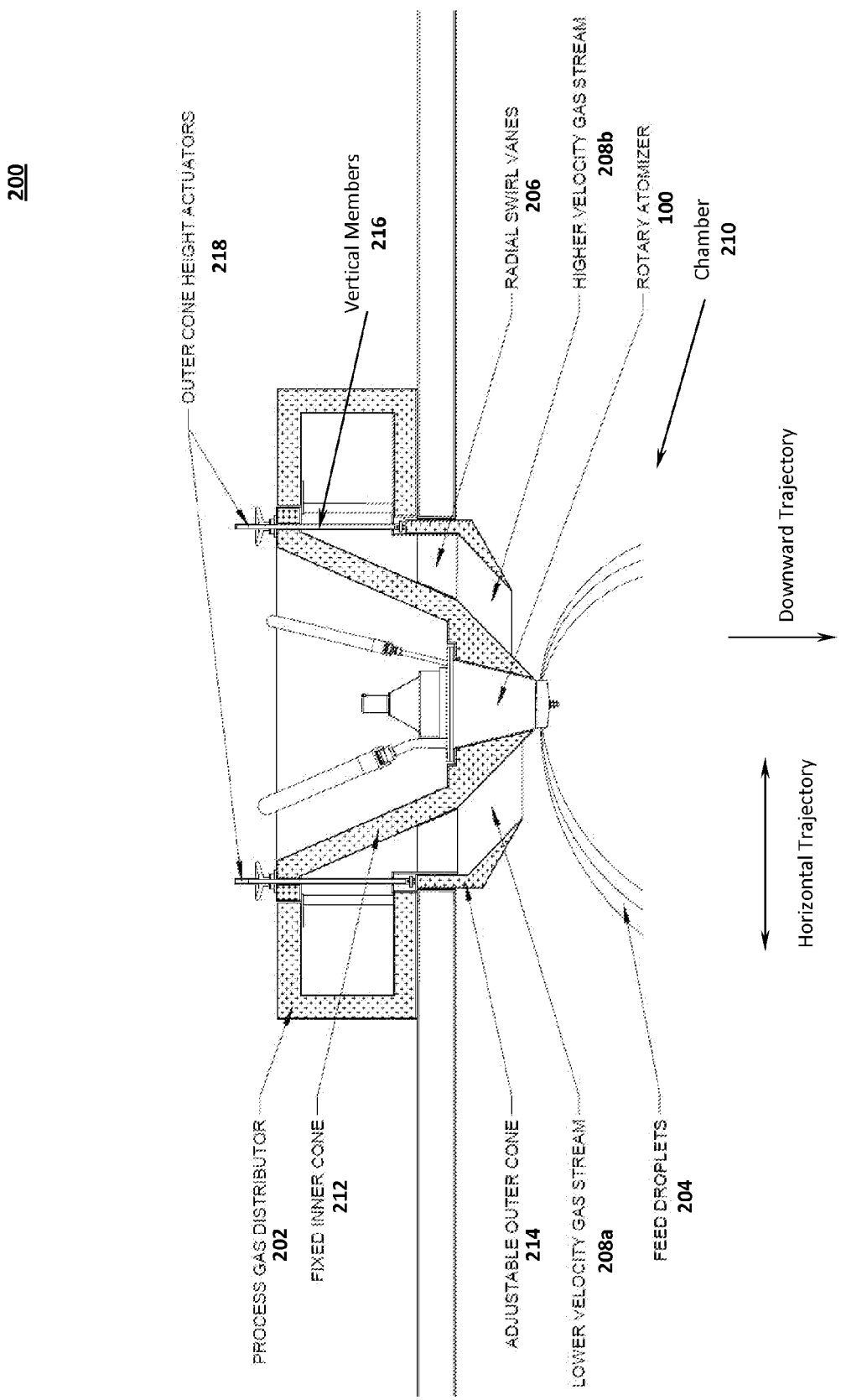

Referring now to the system 200 of FIG. 2, the atomizer 100 of FIG. 1 may be positioned in the fixed inner cone 212 at the center of a gas distributor 202 to evenly distribute either heated or cooled process gas around the atomized droplets 204 produced by the rotating disc. Because the atomizer 100 of FIG. 1 may be constructed to be the same size and dimension of more traditional atomizers, the atomizer 100 may be coupled to existing gas distributors 202, thereby enabling users to easily upgrade existing atomizer systems without the need to make modifications. Included as part of this distributor 202 of FIG. 2 is a series of radial vanes 206 that can impart a swirl pattern to the process gas 208a, 208b. The swirl pattern may be used to ensure proper flow patterns of the gas and droplets through the spray chamber. A notable design parameter in an air distributor system of FIG. 2 is the ability to dynamically adjust the velocity at which the gas stream leaves the radial vanes 206 and meets with the atomized droplets 204. For example, a low gas velocity 208a could allow for larger droplets to travel in a more horizontal trajectory and hit the wall, whereas a high gas velocity 208b could have the opposite effect of forcing the gas along with the droplets in a downward trajectory, keeping the walls clean, but considerably reducing the residence time (i.e., the amount of time the particles are airborne) in the chamber 210.

Determination of the appropriate gas velocity is dependent upon the nature of the feed and the size of the droplets required. In prior systems, changing the gas velocity required physical removal and replacement of components in the gas distributor. However, as disclosed herein, the process gas velocity may be dynamically adjusted while the spray dryer/congealer is in operation, allowing for immediate feedback with no equipment downtime. For instance, an ideal gas velocity would typically be the minimum velocity required, for a desired particle size, to disperse the particles into a chamber without hitting the walls. The dynamic adjustments may be either manually triggered by a user (e.g., one monitoring the system) or controlled by a computer system that measures one or more system parameters and responds by adjusting the gas velocity pursuant to a computer algorithm.

The radial vanes 206 may be repositioned from their normal conical discharge section to a cylindrical section above, thus allowing the process gas to exit through two concentric cones. The inner cone is fixed 212 and may be used to support the atomizer 100 and is typically insulated to prevent the often high temperatures of the gas from affecting the atomizer casing. The outer cone 214 serves to contain the process gas and define its velocity by the cross-sectional sectional area between the two cones. This outer cone may be supported by a series of vertical members 216 that can be varied in height (i.e., lengthwise), thereby changing the vertical position of the outer cone 214 with respect to the fixed inner cone 212. This in turn will vary the cross-sectional area between the two cones and ultimately vary the velocity of the process gas. A smaller cross-sectional area will typically produce a higher gas velocity 208b, while a larger area will result in a lower gas velocity 208a.

Vertical members 216 may be adjusted using one or more height actuators 218. The actuators 218 may be operated, for example, using electric current, hydraulic fluid pressure, or pneumatic pressure or may be operated manually. In applications where adjustment precision is necessary, position feedback elements may be used to actuate vertical members 216 to a predetermined desired position for a particular product.

Although various embodiments have been described with reference to a particular arrangement of parts, features, and the like, these are not intended to exhaust all possible arrangements or features, and indeed many other embodiments, modifications, and variations will be ascertainable to those of skill in the art. Thus, it is to be understood that the invention may be practiced otherwise than as specifically described above. The above-cited patents and patent publications are hereby incorporated by reference in their entirety herein, because they provide additional background information which may be considered relevant to the present application.

What is claimed is:

1. A rotary atomizer comprising:
an electric motor, said electric motor having a stator and a permanent magnet rotor, wherein said permanent magnet rotor is configured to output a rotational force;
a shaft vertically installed, the shaft configured to be rotated by the rotational force;
one or more magnetic bearings, said one or more magnetic bearings configured to provide frictionless radial and axial support to the shaft;
a rotating disc installed at a lower end of the shaft, said rotating disc configured to spray liquid in the form of fine particles; and
an air connector, wherein the air connector receives air to be diverted into one or more gaps between the shaft and the one or more magnetic bearings.

2. The rotary atomizer of claim 1 further comprising one or more cooling fins, wherein the one or more cooling fins direct cooling air from a blower across the stator.

3. The rotary atomizer of claim 2, wherein the cooling air is expelled outside of the rotary atomizer through an annulus gap between the rotating disc and a feed distributor.

4. The rotary atomizer of claim 1, wherein the electric motor is configured to rotate the shaft to yield a disc peripheral tip speed of between 800 and 1125 ft/sec.

5. The rotary atomizer of claim 1, wherein the air connector receives compressed air.

6. The rotary atomizer of claim 5, wherein said compressed air is cooled compressed air.

7. The rotary atomizer of claim 1 further comprising a liquid cooling jacket in thermal communication with the stator.

8. The rotary atomizer of claim 1 further comprising one or more friction back-up bearings.

9. The rotary atomizer of claim 8, wherein said one or more friction back-up bearings are configured to impede the shaft's rotation upon failure of at least one of said one or more magnetic bearings.

10. The rotary atomizer of claim 1, wherein at least one of said one or more magnetic bearings is an electro-magnetic bearing.

11. An atomizer system comprising:
an adjustable outer cone;
a fixed inner cone, said fixed inner cone configured to receive an atomizer;
a chamber; and
one or more adjustable vertical members each of said one or more adjustable vertical members coupled to one or more height actuators, said one or more height actuators configured to dynamically adjust the adjustable outer cone,
wherein the adjustable outer cone, when dynamically adjusted, yields a first gas stream having a first velocity and a second gas steam having a second velocity, the second velocity being different from the first velocity.

12. The atomizer system of claim 11, wherein at least one of the one or more height actuators is an actuator chosen from a group consisting of: (i) electric actuators; (ii) hydraulic actuators; (iii) pneumatic actuators; and (iv) manual actuators.

13. The atomizer system of claim 11, wherein the atomizer is a rotary atomizer having a permanent magnet rotor.

14. The atomizer system of claim 11, wherein the atomizer is a rotary atomizer having a shaft and one or more electro-magnetic bearings configured to provide frictionless radial and axial support to the shaft.

15. The atomizer system of claim 11 further comprising one or more radial swirl vanes.

16. A method for atomizing liquid material comprising:
feeding a liquid material to a rotary atomizer, wherein the rotary atomizer comprises an electric motor configured to rotate a shaft;
using the rotary atomizer to output the liquid material in the form of atomized droplets; and
circulating the atomized droplets with a process gas stream to produce substantially dry particles; and
dynamically adjusting the velocity of said process gas stream using an adjustable outer cone operatively coupled with an actuator.

17. The method of claim 16, wherein the electric motor is configured to rotate the shaft to yield a disc peripheral tip speed between 800 and 1125 ft/sec.

18. The method of claim 16, wherein the rotary atomizer comprises one or more magnetic bearings.

19. The method of claim 18, wherein at least one of said one or more magnetic bearings is an electro-magnetic bearing.

20. The method of claim 19, wherein the electro-magnetic bearing provides frictionless radial and axial support to the shaft.

21. The method of claim 16, wherein the rotary atomizer comprises a permanent magnet rotor.

\* \* \* \* \*

UNITED STATES PATENT AND TRADEMARK OFFICE
CERTIFICATE OF CORRECTION

PATENT NO.          : 8,931,710 B2                                          Page 1 of 1
APPLICATION NO.     : 13/548712
DATED               : January 13, 2015
INVENTOR(S)         : Bazergui It is certified that error appears in the above-identified patent and that said Letters Patent is hereby corrected as shown below:

On the title page, item (54) and in the specification, column 1, line 3: delete "rotar" and insert --rotor-- therefor.

Signed and Sealed this
Nineteenth Day of May, 2015

Michelle K. Lee
*Director of the United States Patent and Trademark Office*